US008549570B2

(12) United States Patent
Forsman et al.

(10) Patent No.: US 8,549,570 B2
(45) Date of Patent: Oct. 1, 2013

(54) METHODS AND APPARATUS FOR MANAGING NETWORK RESOURCES USED BY MULTIMEDIA STREAMS IN A VIRTUAL PIPE

(75) Inventors: Bob Forsman, Sugar Hill, GA (US); Charles Dasher, Lawrenceville, GA (US); Chris Phillips, Hartwell, GA (US); Jennifer Reynolds, Duluth, GA (US); Steve Martin, Centennial, CO (US)

(73) Assignee: Ericsson Television Inc., Duluth, GA (US)

( * ) Notice: Subject to any disclaimer, the term of this patent is extended or adjusted under 35 U.S.C. 154(b) by 0 days.

(21) Appl. No.: 13/403,075

(22) Filed: Feb. 23, 2012

(65) Prior Publication Data
US 2013/0227625 A1 Aug. 29, 2013

(51) Int. Cl.
*H04N 7/173* (2011.01)
(52) U.S. Cl.
USPC .......................................................... 725/95
(58) Field of Classification Search
USPC ................. 725/95, 96; 370/235, 236, 229
See application file for complete search history.

(56) References Cited

U.S. PATENT DOCUMENTS

| | | | | |
|---|---|---|---|---|
| 5,574,934 A * | 11/1996 | Mirashrafi et al. | ............ | 709/207 |
| 6,044,396 A * | 3/2000 | Adams | ............... | 725/95 |
| 6,401,121 B1 * | 6/2002 | Yoshida et al. | ............... | 709/227 |
| 6,412,000 B1 * | 6/2002 | Riddle et al. | ................. | 709/224 |
| 6,445,701 B1 * | 9/2002 | Bahl | ............................ | 370/368 |
| 6,456,591 B1 * | 9/2002 | Mishra | .......................... | 370/229 |
| 6,981,052 B1 * | 12/2005 | Cheriton | ....................... | 709/232 |
| 7,151,781 B2 * | 12/2006 | MeLampy et al. | ............. | 370/468 |
| 7,151,938 B2 * | 12/2006 | Weigand | ...................... | 455/452.1 |
| 7,207,055 B1 * | 4/2007 | Hendricks et al. | ............... | 725/95 |
| 7,225,459 B2 * | 5/2007 | Magliaro | .......................... | 725/98 |
| 7,251,218 B2 * | 7/2007 | Jorgensen | ...................... | 370/235 |
| 7,330,475 B2 * | 2/2008 | Henrion | ....................... | 370/410 |
| 7,362,706 B2 * | 4/2008 | Grosbach et al. | ........... | 370/230.1 |
| 7,389,356 B2 * | 6/2008 | Shao et al. | ...................... | 709/235 |
| 7,453,804 B1 * | 11/2008 | Feroz et al. | .................... | 370/230 |
| 7,469,295 B1 * | 12/2008 | Gangadharan | ................. | 709/232 |
| 7,543,326 B2 * | 6/2009 | Moni | ............................... | 725/95 |
| 7,593,326 B2 * | 9/2009 | Collet et al. | .................... | 370/229 |
| 7,983,299 B1 * | 7/2011 | Ma | ................................... | 370/468 |
| 8,213,322 B2 * | 7/2012 | Jones et al. | ..................... | 370/252 |
| 8,339,961 B2 * | 12/2012 | Nakahira | ....................... | 370/235 |
| 2004/0226044 A1 * | 11/2004 | Goode | ............................. | 725/95 |
| 2005/0249114 A1 * | 11/2005 | Mangin et al. | ................. | 370/229 |
| 2005/0289618 A1 * | 12/2005 | Hardin | ............................. | 725/95 |
| 2008/0025218 A1 * | 1/2008 | Liu | ................................... | 370/235 |
| 2008/0069201 A1 * | 3/2008 | Zhu et al. | .................... | 375/240.1 |
| 2009/0031382 A1 * | 1/2009 | Cope | ............................... | 725/115 |
| 2010/0135158 A1 * | 6/2010 | Adams | .......................... | 370/235 |
| 2010/0315949 A1 * | 12/2010 | Agarwal | ....................... | 370/235 |

* cited by examiner

*Primary Examiner* — Pankaj Kumar
*Assistant Examiner* — Timothy Newlin

(57) ABSTRACT

Some embodiments are directed to a method performed by a pipe control node for managing network resources that are used to transport network traffic. The method includes allocating network resources to a virtual pipe for transporting a plurality of multimedia streams through the network. Utilization of the network resources by the plurality of multimedia streams transported through the virtual pipe is monitored relative to the network resources allocated to the virtual pipe. The network resources that are used by the plurality of multimedia streams transported through the virtual pipe are managed in response to the monitored utilization. Some other embodiments are directed to a corresponding pipe control node that manages network resources which are used to transport network traffic.

16 Claims, 10 Drawing Sheets

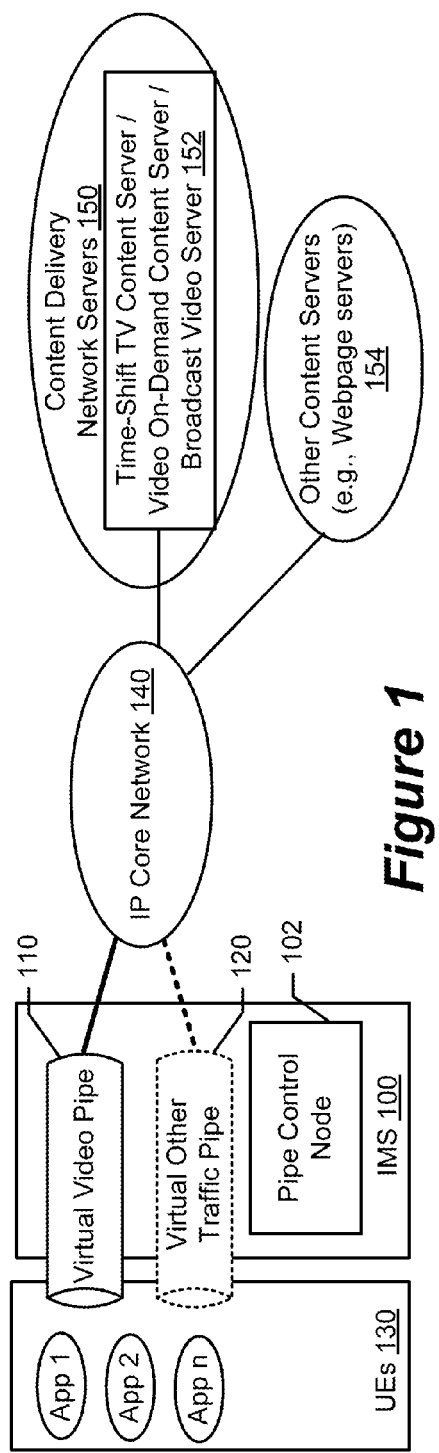
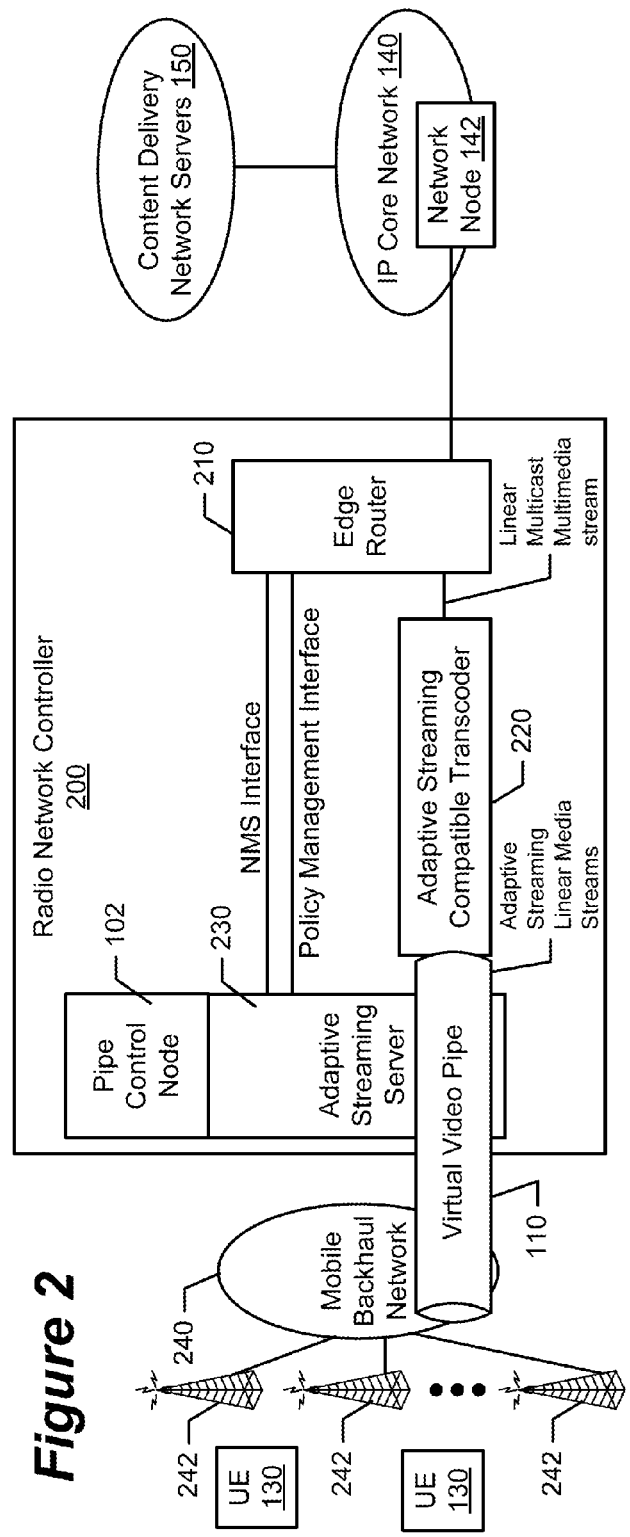
*Figure 1*
*Figure 2*

METHODS AND APPARATUS FOR MANAGING NETWORK RESOURCES USED BY MULTIMEDIA STREAMS IN A VIRTUAL PIPE

TECHNICAL FIELD

The present disclosure relates to communication networks and, more particularly, to managing utilization of network resources.

BACKGROUND

Adaptive HTTP streaming technology (such as Apple HTTP Live Streaming (HLS), Microsoft Smooth Streaming, Adobe Dynamic Streaming over HTTP or MPEG DASH) is being implemented to handle increasing consumer demands for streaming video from Over The Top (OTT) applications on OTT content servers (e.g., movies/TV on demand) to User Equipment nodes (UEs) (e.g., such as set-top-boxes multimedia computers, and wireless terminals) across a core network.

Internet service providers (ISPs) have long struggle with how to provide a sufficient Quality of Service (QoS) level to their customers in view of bandwidth limitations in their networks. ISPs have attempted to manage use of their network resources by various strategies for charging customers for consumption, limiting bandwidth provided to particular customers, and banning certain types of network traffic.

Some existing network management schemes allow UEs to attempt to take as much bandwidth as desired for HTTP adaptive streaming from a content provider regardless of how much bandwidth is actually available to the content provider. UEs and content providers may only "adapt" to changing network conditions when the available bandwidth is fully consumed. This can be a problem for content providers who may want to control the bandwidth they provide to individual streams.

Some existing network management schemes implemented by ISPs are controversial, both with customers and with government agencies. Laws that will enforce "Net Neutrality", which will ban ISPs from restricting bandwidth usage by content types, have been enacted by the Netherlands and are being considered in many other countries. Consequently, streaming media continues to disproportionately utilize ISP network resources and IPSs do not have adequate network management schemes to regulate such usage.

SUMMARY

Some embodiments are directed to a method by a pipe control node for managing network resources that are used to transport network traffic. The method includes allocating network resources to a virtual pipe for transporting a plurality of multimedia streams through the network. Utilization of the network resources by the plurality of multimedia streams transported through the virtual pipe is monitored relative to the network resources allocated to the virtual pipe. The network resources that are used by the plurality of multimedia streams transported through the virtual pipe are managed in response to the monitored utilization.

Accordingly, the virtual pipe can be managed to allow streaming devices to consume only as much bandwidth as is allocated to the virtual pipe, without interfering with traffic that is transported outside the virtual pipe. In some further embodiments, network resources may be allocated for transporting bandwidth intensive video streams while preventing/avoiding interference with the network resources that are available for transporting other network traffic (e.g. non-video streams, such as web browsing traffic) outside the virtual pipe. Correspondingly, the network resources that are allocated for transporting streams through the virtual pipe may be reserved for use by those streams so that the other network traffic does not interfere with the streams transported through the virtual pipe. Within the virtual pipe, the bandwidth resources provided to individual streams can be managed to, for example, provide tiered management of streams (e.g. based on device type, user account, or content type) so that streams of a same tier level have their access to network resources managed in a same scheduling algorithm.

Some other embodiments are directed to a pipe control node that manages network resources which are used to transport network traffic. The pipe control node includes circuitry that is configured to allocate network resources to a virtual pipe for transporting a plurality of multimedia streams through the network. The circuitry monitors utilization of the network resources by the plurality of multimedia streams transported through the virtual pipe relative to the network resources allocated to the virtual pipe. The circuitry manages the network resources that are used by the plurality of multimedia streams transported through the virtual pipe in response to the monitored utilization.

Other methods and apparatuses according to embodiments of the invention will be or become apparent to one with skill in the art upon review of the following drawings and detailed description. It is intended that all such additional methods and apparatuses be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 1 is a block diagram of a communications system that is configured to operate according to some embodiments;

FIG. 2 is a more detailed block diagram of the communication system of FIG. 1 showing further aspects of a virtual video pipe configured according to some embodiments;

DETAILED DESCRIPTION

Figure 3:
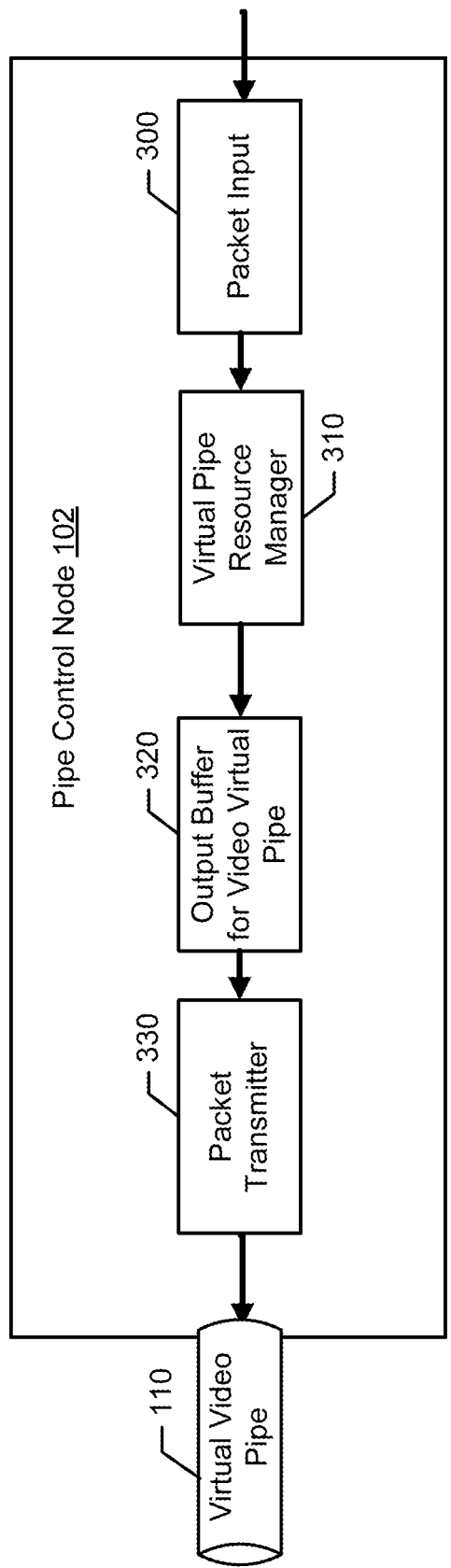
FIG. 3 is a block diagram of a pipe control mode configured according to some embodiments.

The invention will now be described more fully hereinafter with reference to the accompanying drawings, in which embodiments of the invention are shown. This invention may, however, be embodied in many different forms and should not be construed as limited to the embodiments set forth herein.

In accordance with various embodiments of the present invention, an ISP or other network operator can allocate network resources for a "virtual pipe" that is used to transport HTTP traffic associated with multimedia streams and, in particular, video streams. Network resources can be allocated to the virtual pipe for transporting a plurality of multimedia streams through a network. The virtual pipe can be managed to allow streaming devices to consume only as much bandwidth as is allocated to the virtual pipe, without interfering with traffic that is transported outside the virtual pipe.

Accordingly, network resources can be allocated for transporting bandwidth intensive video streams while preventing/avoiding interference with the network resources that are available for transporting other network traffic (e.g. non-video streams, such as web browsing traffic) outside the virtual pipe. Correspondingly, the network resources that are allocated for transporting streams through the virtual pipe can be reserved for use by those steams so that the other network traffic does not interfere with the streams transported through the virtual pipe. Within the virtual pipe, the bandwidth resources provided to individual streams can be managed to, for example, provide tiered management of streams (e.g. based on device type, user account, or content type) so that streams of a same tier level have their access to network resources managed according to a same scheduling algorithm, such as a Fair Network Queuing algorithm.

FIG. 1 is a block diagram of a communications system that is configured to operate according to some embodiments. Referring to FIG. 1, a plurality of UEs 130 and/or a plurality of applications ("App 1" ... "App n") on one or more UEs can communicate through an IP Multimedia Subsystem (IMS) 100 and IP core network 140 in order to receive selected content from a content delivery network servers 150 and/or other content servers 154.

The content delivery network servers 150 can include time-shifted TV content servers 152, video on-demand content servers 152, and/or broadcast video servers 152. The other content servers 154 may, for example, primarily contain web page content, social network content, etc. The UEs 130 may include, but are not limited to, set-top-boxes, multimedia computers, wireless terminals, and other electronic devices that are configured to receive multimedia streams.

In accordance with some embodiments, the system further includes a pipe control node 102 that manages network resources which are used to transport network traffic. The pipe control node comprises circuitry that is configured to allocate network resources to a virtual pipe 110 for transporting a plurality of video streams through the network. The pipe control node 102 circuitry monitors utilization of the network resources by the plurality of video streams transported through the virtual pipe relative to the network resources allocated to the virtual pipe. The pipe control node 102 circuitry manages the network resources that are used by the plurality of video streams transported through the virtual pipe in response to the monitored utilization.

Although various embodiments are described herein in the context of providing a virtual video pipe for transporting video streams, the invention is not limited thereto and may be used to transport other information relating to the video streams (e.g. manifest information), informational descriptions of the video streams, single/multi-language audio streams, or other types of network traffic. Accordingly, the pipe controller 102 may allocate network resources to another virtual pipe 120 for transporting a plurality of other types of network traffic. Although only two virtual pipes 110 and 120 are shown in FIG. 1 for convenience of illustration, the pipe control node 102 may manage any number of virtual pipes and the associated network resources used by traffic that is allowed to be transported using the resources allocated to the respective virtual pipes. The network resources that are assigned to a virtual pipe, monitored for utilization, and managed may include bandwidth, latency, priority, and/or other parameters that affect QoS associated with transporting traffic through network nodes within the IMS 100, the core network 140, and/or other network nodes. Moreover, although various embodiments are described herein in the context of controlling network resources in an IMS 100 and mobile network (e.g., radio network controller), the invention is not limited thereto and may be applied to manage other types of network resources.

FIG. 2 is a more detailed block diagram of the communication system of FIG. 1 showing further aspects of the management of network resources allocated to the virtual video pipe 110. In the example of FIG. 2, UEs 130 (FIG. 1) can communicate with the content delivery network 150 to request and receive a video streams through the IP core network 140, a radio network controller 200, a mobile backhaul network 240, and one or more radio transceiver base stations 242 that provide wireless communication service to the UEs 130. The video streams can flow through an edge router 210 and adaptive streaming server 230 in the radio network controller 200. The adaptive streaming server 230 can regulate bandwidth of individual video streams responsive to available network bandwidth resources to the UEs 130 through the mobile backhaul network 240 and radio transceiver base stations 242. The content delivery network 150 may, in some embodiments, provide video streams toward the adaptive streaming server 230, and an adaptive streaming compatible transcoder 220 can adaptively transcode the video streams to generate different bandwidth video streams that can be selectively provided to the UEs 130 responsive to the available network resources (e.g., available communication bandwidth) therebetween. The adaptive streaming server 230 can communicate with the edge router 210 through a Network Management System (NMS) and Policy Management Interface to monitor and control available network resources.

The pipe control node 102 may control the edge router 210 to negotiate and establish with one or more network nodes 142 of the IP core network 140 the allocation, monitoring, and management of network resources that will transport certain types of network traffic and/or network traffic from one or more defined source network nodes (e.g. one or more of the content delivery network servers 150. The pipe control node 102 may control the adaptive streaming server 230 to negotiate with one or more network nodes of the mobile backhaul network 240 for the allocation, monitoring, and management of network resources for the video pipe 110 that will transport certain types of network traffic and/or network traffic from one or more defined source network nodes (e.g. one or more of the content delivery network servers 150.

FIG. 3 is a block diagram of a pipe control mode 102 configured according to some embodiments. Although various communication flows are indicated by arrows to show example primary communication directions, it is to be understood that communications can occur opposite to the arrows. The pipe control node 102 may include circuitry for packet input 300, virtual pipe resource manager 310, an output buffer 320, and packet transmitter 330. The packet input 300 may be configured to receive a manifest message from a content server 152 which identifies, for example, URL addresses from which video streams having defined data bandwidth can be read (e.g., URL1-4 Mbs, URL2-2 Mbs, URL3-1 Mbs). The packet input 300 may select among the URL addresses for reading the associated video stream in response to decisions by the virtual pipe resource manager 310 which is managing the data bandwidth utilized by the associated video streams. The packet input 300 can temporarily store the received packets for a video stream in an input buffer.

Various example operations and methods that can be performed at least partially by the virtual pipe resource manager 310 will now be explained with reference to the flowcharts of FIGS. 9-15. The resource manager 310 manages network resources which are used to transport network traffic. The resource manager 310 allocates (block 900—FIG. 9) network resources to the virtual pipe 110 for transporting a plurality of video (or other multimedia) streams through the network. The resource manager 310 monitors (block 902—FIG. 9) utilization of the network resources by the plurality of multimedia streams transported through the virtual pipe relative to the network resources allocated to the virtual pipe. For example, the edge router 210, the adaptive streaming server 230, and/or other network nodes may communicate resource utilization information to the resource manager 310. The resource manager 310 manages (block 904—FIG. 9) the network resources that are used by the plurality of multimedia streams transported through the virtual pipe in response to the monitored utilization.

The pipe control node 102 may, in some embodiments, receive network traffic that only relates to video streams that are to be transported by network resources allocated to the virtual video pipe 110. However, in some other embodiments, it may receive other network traffic that is not be managed through the resources of the video pipe 110 and, therefore, can be further configured to distinguish between different types of network traffic. The resource manager 310 may determine (block 1000—FIG. 10) whether particular network traffic for a video stream is to be transported by network resources allocated to the video pipe 110, and which may be determined by comparing a source address of packets of the video stream to a known list of source addresses of network nodes (e.g., the content servers 152) that provide video streams for the video pipe 110. The resource manager 310 includes (block 1002—FIG. 10) the particular network traffic in the virtual pipe 110, using network resources allocated to the virtual pipe 110, in response to the particular network traffic transporting a video stream. Otherwise, the resource manager 310 excludes (block 1002—FIG. 10) the particular network traffic from utilization of the network resources allocated to the virtual pipe 110 in response to the particular network traffic not transporting a video stream.

The resource manager 310 may constrain (block 1100—FIG. 11) the network resources used by each of the video streams transported through the virtual pipe 110 in response to a combined utilization of the network resources by the video streams exceeding a defined threshold level. When the combined utilization of the network resources exceeds the defined threshold level, the resource manager 310 may begin controlling the network resources used by individual ones of the video streams by controlling a time delay between when data packets for each of the video streams arrives when they leave. For example, the resource manager 310 may control (block 1102—FIG. 11) timing of delay, between arrival of data packets of the video streams at an input buffer (e.g., at the packet input 300 of the control node 102 or another network node) and placement of the packets in an output buffer 320 for forwarding from the control node 102 (or another network node) by a packet transmitter 330 through the video pipe 110, responsive to a defined scheduling algorithm. The scheduling algorithm may be a Fair Network Queuing (FNQ) algorithm, a round-robin algorithm, etc.

Figure 5:
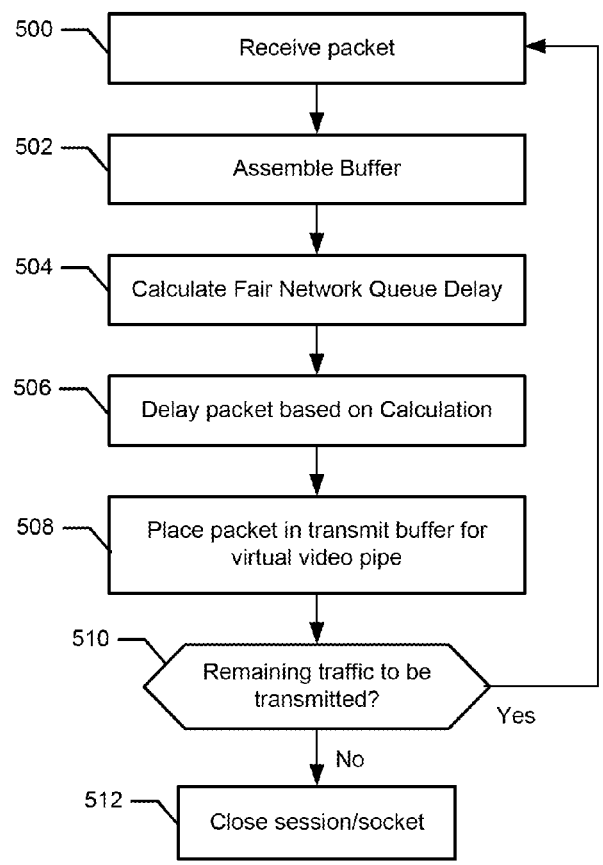
FIG. 5 is a flowchart of operations and methods may be performed by a pipe control node according to some embodiments.

FIG. 5 is a flowchart of example operations and methods that may be performed by the control node 102 to manage resource utilization by the video streams according to a FNQ algorithm. Packets for the video streams are received or fetched from know URLs at the content servers 152 (block 500), and are assembled (block 502) into one or more buffers. A FNQ time delay is separately calculated (block 504) for packets of each of the video streams, and the packets associated with each of the video streams are separately delayed (block 506) by the calculated FNQ time delay before being placed (block 508) in an output buffer 330 for transmission by a packet transmitter 330 through the video pipe 110. A decision (block 510) is made as to whether more packets remain in input buffers for the various video streams. When no remaining packet traffic is to be transmitted for a particular one of the video streams, the pipe control node 102 and/or another network node may close (block 512) the session/socket for the particular video stream.

Figure 6:
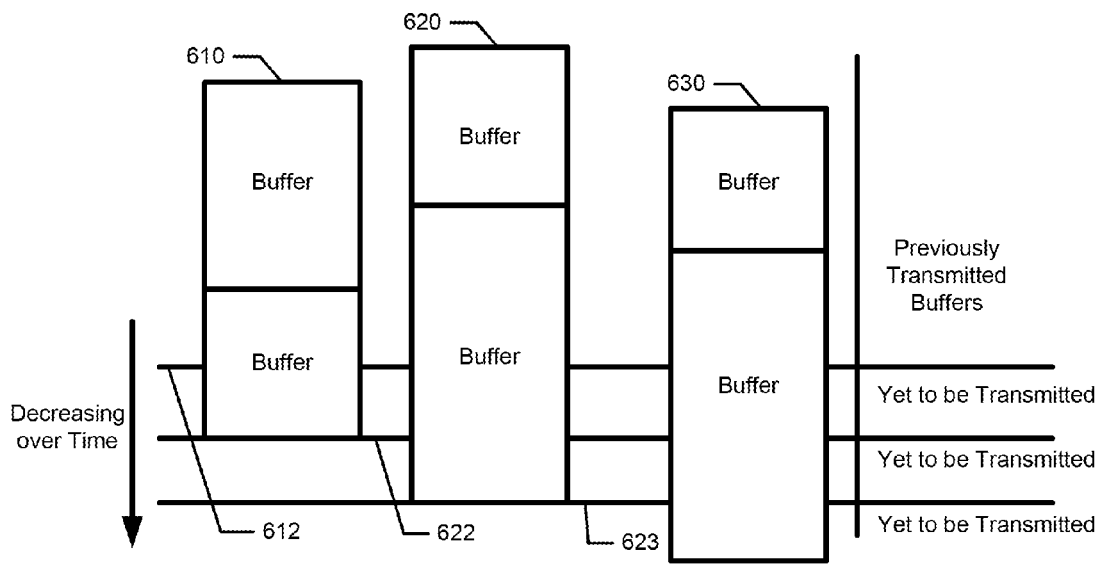
FIG. 6 illustrates example operation of a scheduling algorithm that may be used to control timing of delay between receipt of data packets and forwarding of the data packets from a network node.

FIG. 6 illustrates example operations of a scheduling algorithm that may be used, e.g., by the pipe control node 102, to control timing of delay between receipt of data packets and forwarding of the data packets from a network node using network resources of the video pipe 110. Three buffers 610, 620, 630 are shown in the example of FIG. 6 for convenience of description, although the buffers may reside in one physical buffer memory or within separate physical buffer memories. Packets for different video streams are temporarily stored in different buffers 610, 620, 630. The timing between when packets are placed in the buffers 610, 620, 630 and subsequently read from the buffers 610, 620, 630 for transmission through the network is controlled responsive to a defined scheduling algorithm.

In one embodiment, the resource manager 310 of the control node 102 may sequentially read a packet(s) from each of the buffers 610, 620, 630 for transmission through the network in a defined order (e.g., read packet(s) from buffer 610 to reduce level to illustrated level 612, read packet(s) from buffer 620 to reduce level to illustrated level 622, and read packet(s) from buffer 630 to reduce level to illustrated level 623), and may repeat the reading cycle while skipping buffers that become empty and including more buffers as packets arrive for other video streams. An equal number of packets may be read from each of the buffers 610, 620, 630 during each cycle, or more packets may be read from particular ones of the buffers 610, 620, 630 and/or may be read more frequently from particular ones of buffers 610, 620, 630 having packets for higher priority designated video streams, higher requested bandwidth video streams, and/or which are associated with a customer and/or UE having a designated tier of service (e.g., a higher tier of service than another one or more of the other video streams associated with other ones of the buffers).

Illustrative Use Examples

Figure 7:
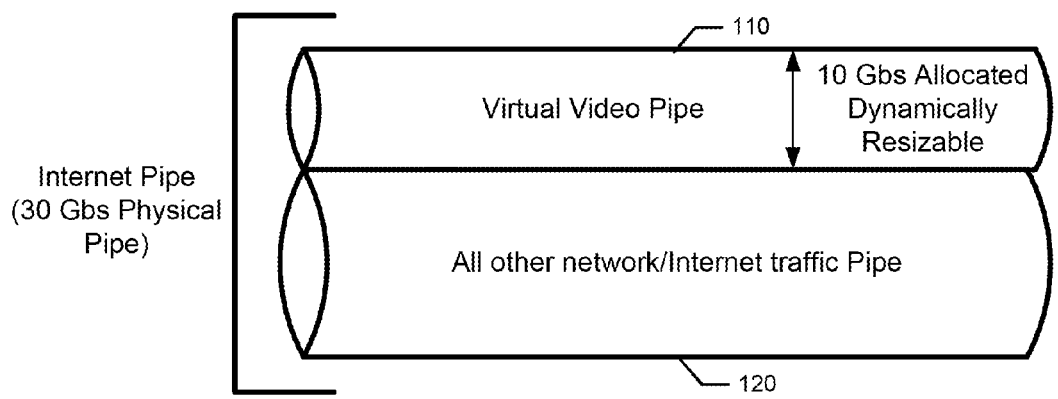
FIGS. 7 and 8A-E illustrate a virtual pipe, and operations and methods for dynamically resizing resources allocated to video streams transported by the virtual pipe.

FIGS. 7 and 8A-E illustrate a virtual pipe, and operations and methods for dynamically resizing network resources that are allocated to video streams transported by the virtual pipe, and which operations and methods may be performed by the pipe control node 102. Referring to FIG. 7, an Internet pipe through network nodes has been illustrates as having a 30 Gbs (gigabits per second) bandwidth limitation. The Internet pipe contains a video delivery pipe 110 that has been allocated 10 Gbs of bandwidth for transporting video (or other multimedia) streams through the Internet pipe. The remaining 20 Gbs of bandwidth remains for use in transporting other network/Internet traffic, and which may be formally allocated and managed as another pipe 120 for that traffic or may be unmanaged by the pipe control node 102.

Figure 14:
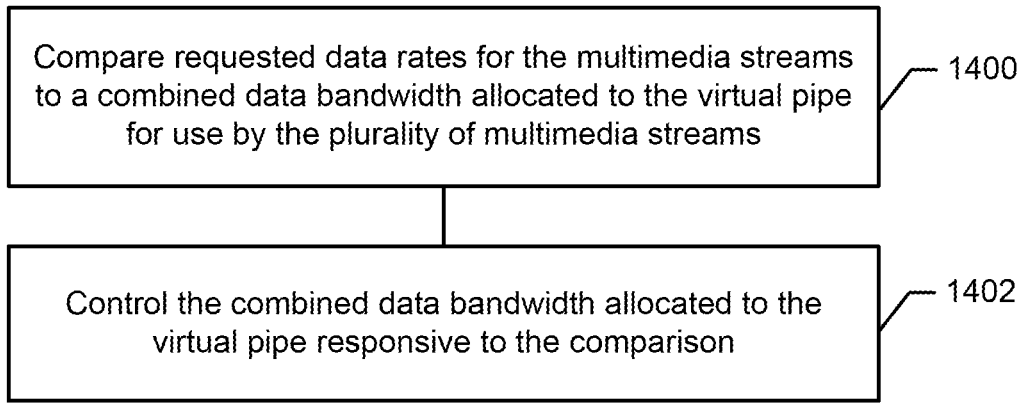
Figure 15:
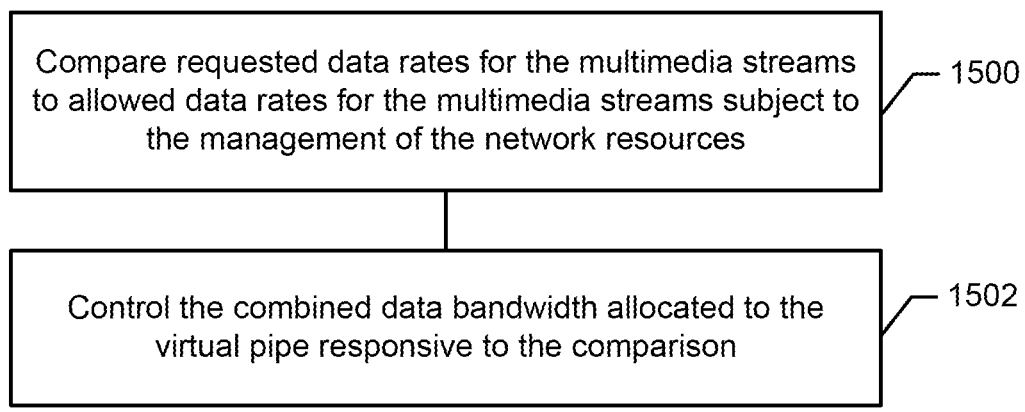

The size of (e.g., amount of data bandwidth allocated to) the virtual video pipe 110 may be dynamically controlled in response to utilization of the network resources allocated to the virtual video pipe 110 and/or in response to utilization of the network resources that remain outside the virtual video pipe 110 (e.g., within another traffic pipe 120). Various relevant operations and methods for regulating the size of the virtual video pipe 110 are shown in FIGS. 14 and 15.

When regulating the size of the video pipe 110, the pipe control node 102 may compare (block 1400—FIG. 14) requested data rates for the video streams (e.g., which may be information received as part of a video stream manifest from the content servers 152) to a combined data bandwidth (e.g., 10 Gbs) allocated to the virtual pipe for use by the plurality of video streams. The pipe control node 102 may control (block 1402—FIG. 14) the combined data bandwidth allocated to the virtual pipe responsive to the comparison.

Alternatively or additionally, when regulating the size of the video pipe 110, the pipe control node 102 may compare (block 1500—FIG. 15) requested data rates for the video streams (e.g., which may be information received as part of a video stream manifest from the content servers 152) to allowed data rates for the video streams subject to the available resources of the network (e.g. what actual data rates have each of the video streams been provided by the network). The pipe control node 102 may control (block 1502—FIG. 15) the combined data bandwidth allocated to the virtual pipe responsive to the comparison.

Reference is now made to the examples of FIGS. 8A-E in which the data bandwidth that is allocated to a virtual pipe 800 (e.g., video pipe 110 in FIG. 1) is dynamically resized responsive to the utilization of the network resources of the virtual pipe 800.

Figure 8A:
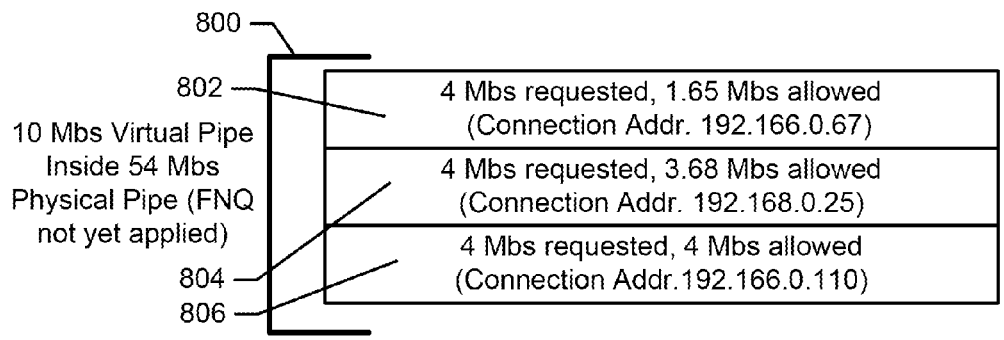
Figure 10:
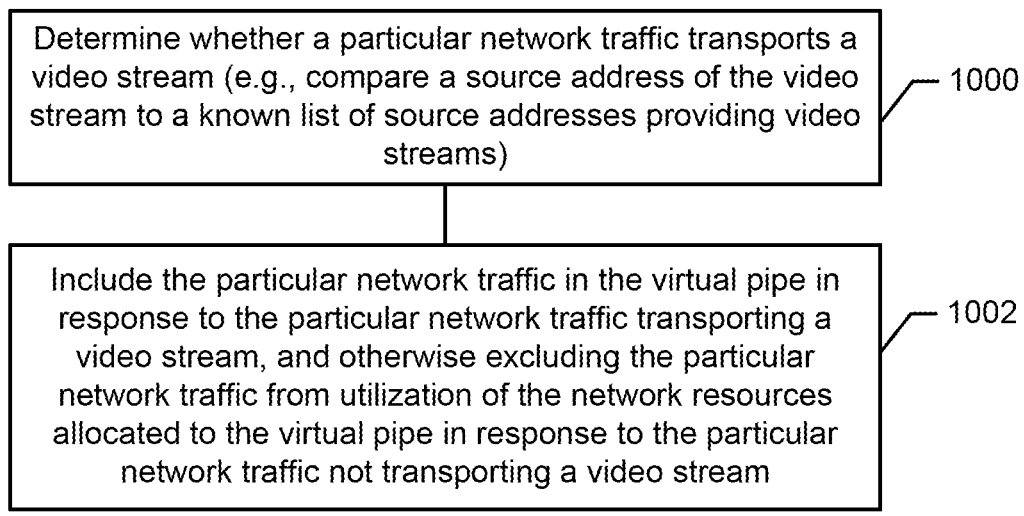
Figure 11:
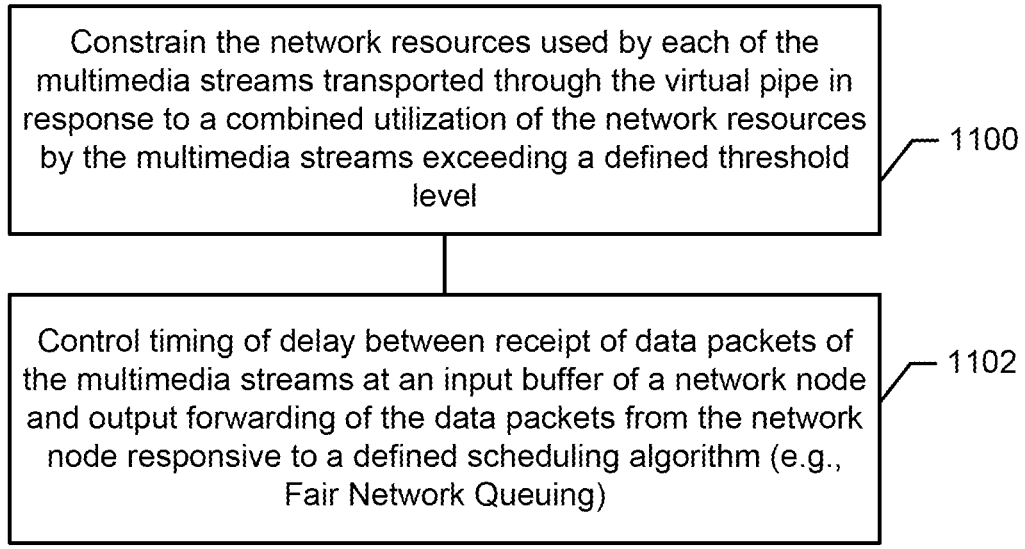
Figure 12:
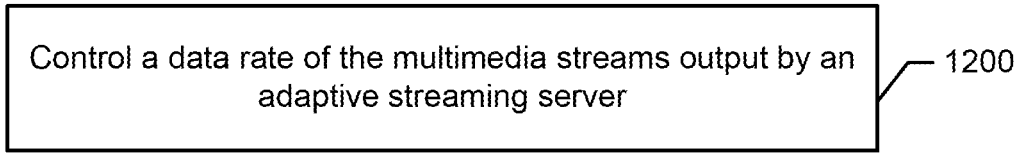
Figure 13:
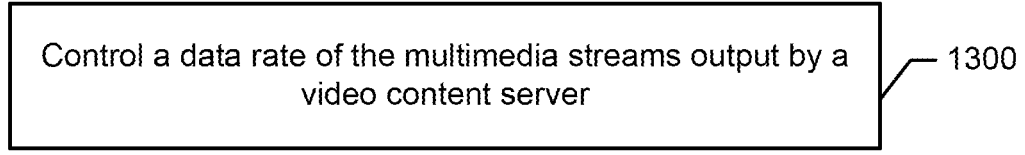

In FIG. 8A, 10 Mbs of network bandwidth has been allocated to the virtual pipe 800. The virtual pipe 800 is inside a 54 Mbs physical pipe. Three video streams 802, 804, 806 are presently being transported using resources of the virtual pipe 800. The combined bandwidth that is presently requested by the three video streams exceeds the total network bandwidth allocated to the virtual pipe 800. However, the video streams are not yet managed (e.g., using a scheduling algorithm, such as FNQ) according to embodiments of the present invention and, consequently, some of the video streams are disproportionately constrained relative to one another. The video stream 802 originated from connection address 192.166.0.67, requested 4 Mbs (e.g., information received from the content server), but is presently using only 1.65 Mbs of the network bandwidth. The video stream 804 (connection address 192.168.0.25) requested 4 Mbs and is presently using 3.68 Mbs of the network bandwidth. However, in contrast to streams 802 and 804, the video stream 806 (connection address 192.266.0.110) requested 4 Mbs and is presently using 4 Mbs, which is the entire bandwidth requested. Consequently, video stream 806 has been provided its entire requested bandwidth, but has thereby left insufficient remaining resources for the video streams 802 and 804 and resulted in disproportionate negative consequences thereto.

Figure 8B:
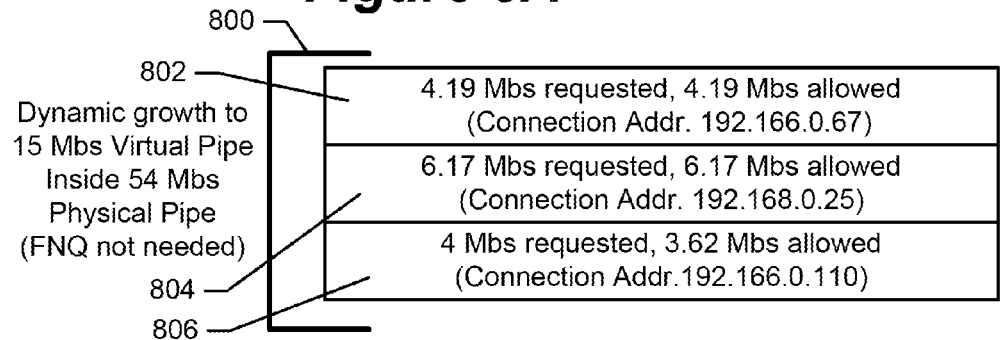

In FIG. 8B, the network bandwidth allocated to the virtual pipe 800 has been dynamically increased to 15 Mbs in response to growth in the combined bandwidth requests of the three video streams relative to the requested bandwidths shown in FIG. 8A. The video stream 802 now requests and receives 4.19 Mbs of the network bandwidth. The video stream 804 now requests and receives 6.17 Mbs of the network bandwidth. However, in contrast to streams 802 and 804, the other video stream 806 still requests 4 Mbs but is now constrained to using only 3.62 Mbs. Thus, the video streams 802 and 804 have left insufficient remaining resources for use by the video stream 806.

Figure 8C:
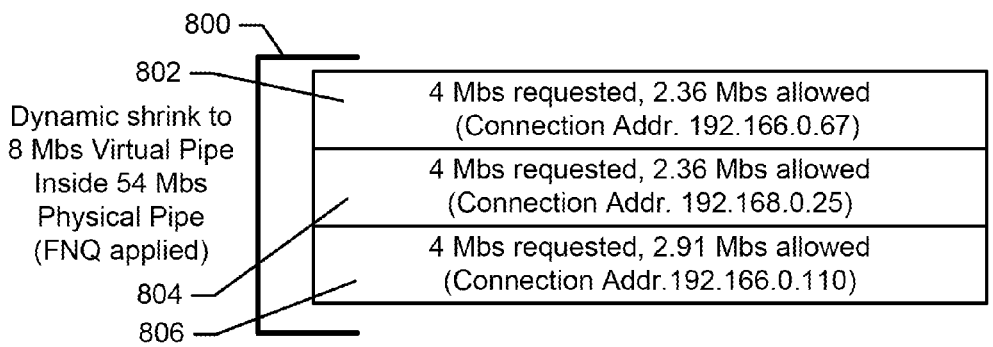

In FIG. 8C, the network bandwidth allocated to the virtual pipe 800 has been dynamically decreased to 8 Mbs in response to, for example, reallocate network bandwidth of the Internet pipe 800 for use by other network traffic (e.g. pipe 120 of FIG. 7) and/or in response to a decrease in the combined bandwidth requests of the streams 802, 804, 806 decreasing to 12 Mbs. In response to the requested data rates for the streams (12 Mbs) exceeding a defined threshold value, such as the network bandwidth (8 Mbs) allocated to the virtual pipe 800, the bandwidth that is provided to each of the video streams 802-806 is separately controlled responsive to a defined scheduling algorithm (e.g., FNQ scheduling algorithm). The video stream 802 now requests 4 Mbs and is constrained to using 2.36 Mbs, video stream 804 now requests 4 Mbs and is constrained to using 2.36 Mbs, and video stream 806 now requests 4 Mbs and is constrained to using 2.91 Mbs. Accordingly, the bandwidth allowed for each of the video streams is controlled to more fairly balance the constraint imposed on the three video streams. The video stream 806 may be granted a higher bandwidth because it is associated with a higher tier service level then the other video streams 802 and 806.

Figure 8D:
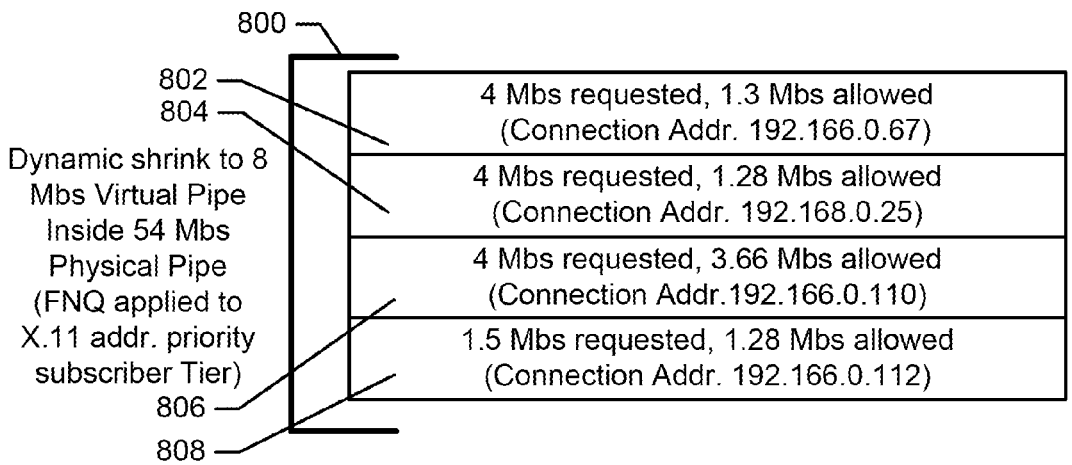

In FIG. 8D, a fourth video stream 808 is now also carried by the virtual pipe 800, and the network bandwidth allocated to the virtual pipe 800 has been shrunk to or remains at 8 Mbs. Each of the four video streams is controlled according to a defined scheduling algorithm (e.g., FNQ scheduling algorithm). The fourth video stream 808 requests 1.5 Mbs and is constrained to using 1.28 Mbs, which is proportionally more bandwidth than is allowed for use by the other three video streams 802-806, which have each requested 4 Mbs and been constrained to 2.3 Mbs, 1.63 Mbs, and 3.26 Mbs respectively. The fourth video stream 808 may be associated with a high tier service level than the other three video streams 802-806 and, therefore, may be allowed to have proportionally more bandwidth than the other three video streams 802-806.

Figure 8E:
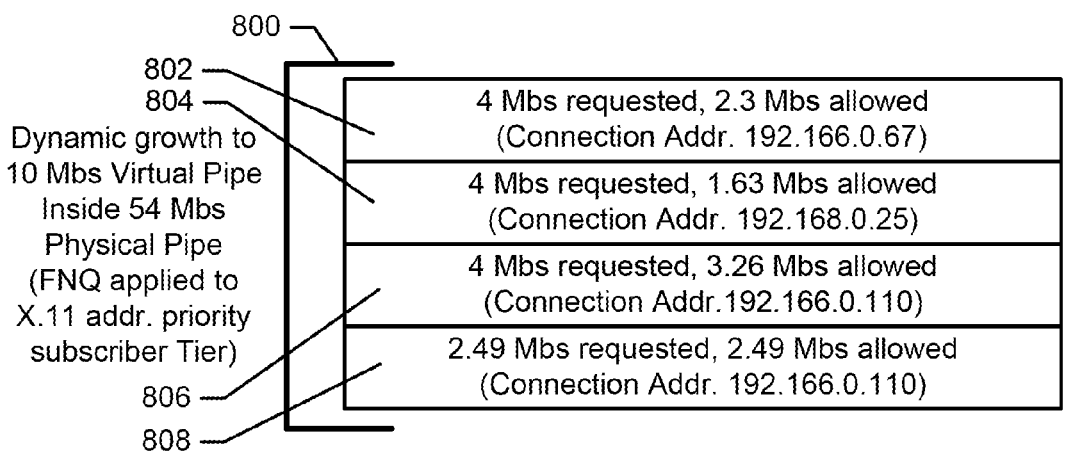
Figure 9:
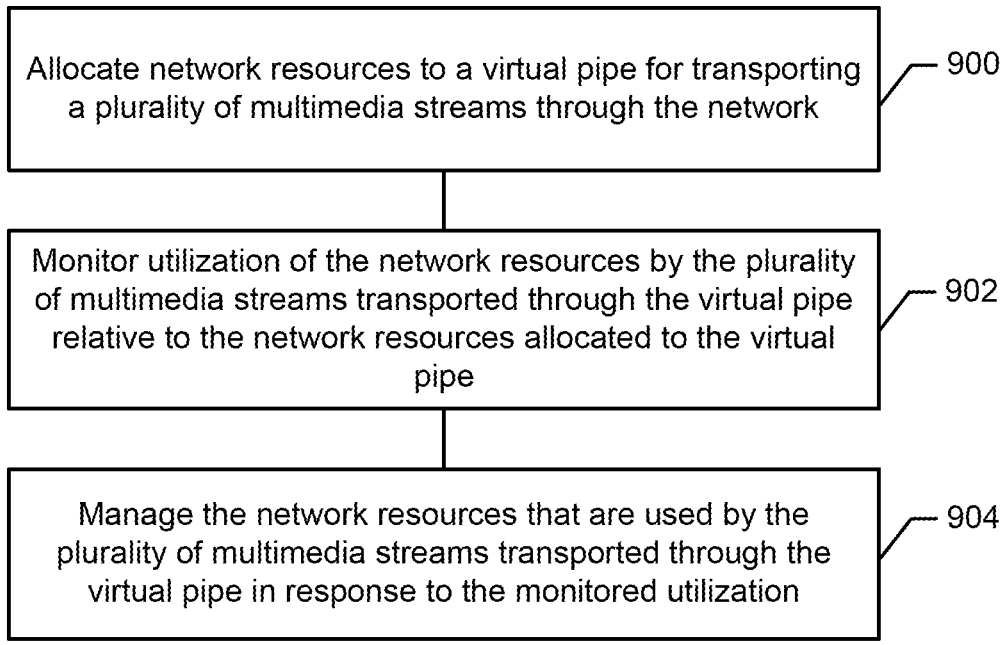
FIG. 9-15 are flowcharts of operations and methods by a pipe control mode according to some embodiments.

In FIG. 8E, the network bandwidth allocated to the virtual pipe 800 has been dynamically increased to 10 Mbs in response to, for example, the excessive combined bandwidth requested by the four video streams. Each of the four video streams is controlled according to a defined scheduling algorithm (e.g., FNQ scheduling algorithm), and the fourth video stream 808 is provided proportionally more bandwidth than the other three video streams 802-806 because of, for example, the fourth video stream 808 being associated with a high tier service level than the other three video streams 802-806.

Illustrative Use Examples

Figure 4:
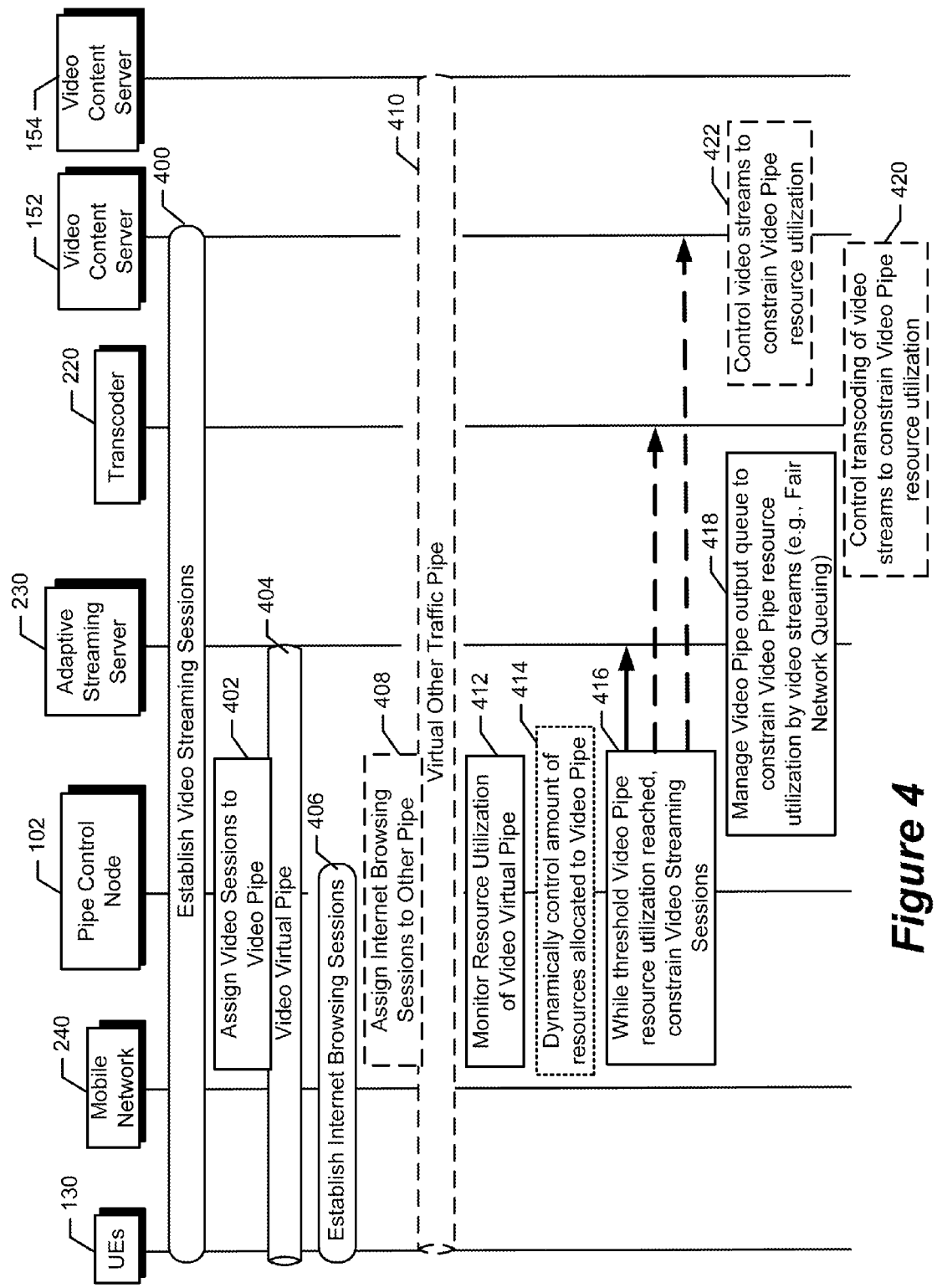
FIG. 4 is a data flow diagram that illustrates operations and methods performed by various nodes of the system of FIG. 2 configured according to some embodiments.

FIG. 4 is a data flow diagram that illustrates operations and methods performed by various nodes of the system of FIG. 2 configured according to some embodiments. Referring to FIG. 4, video streaming sessions are established 400 between the UEs 130 and one or more video content servers 152. Traffic associated with the video streams is assigned 402 to a video pipe. The video pipe may be established 404 between two or more network nodes, although it may be extend further along the session pathway between the UEs 130 and the adaptive streaming server 230 through the mobile network 240. Internet browsing sessions are separately established 406 and, in some embodiments, may be managed in a similar manner to that described above for the video streams by being assigned 408 to another pipe 410 that may extend at least partially along the session pathway.

Utilization of the network resources by the plurality of video streams transported through the video pipe is monitored 412 relative to the network resources that are allocated to the video pipe. The network resources that are allocated to the video pipe may, in some embodiments, be dynamically controlled 414. While the monitored utilization of the network resources allocated to the video pipe exceeds the defined threshold, the video streams for the sessions are constrained 416.

In one embodiment, the control node 102 can constrain the resource is used by different ones of the video streams by controllably delay the respective video streams, as described above. Alternatively or additionally, according to the operations and methods of FIG. 12, the control node 102 may communicate with the adaptive streaming server 230 to control (block 1200—FIG. 12, block 418—FIG. 4) a data rate of the video streams that are output by the adaptive streaming server 230. In yet another alternative or additional embodiment, according to the operations and methods of FIG. 13, the control node 102 may communicate with the content server 152 to control (block 1300—FIG. 13, block 422—FIG. 4) a data rate of the video streams that are output by the content server 152. In yet another alternative or additional embodiment, the control node 102 may communicate with the transcoder 220 to control (block 420—FIG. 4) a data rate of the video streams that are output by the transcoder 220.

Figure 16:
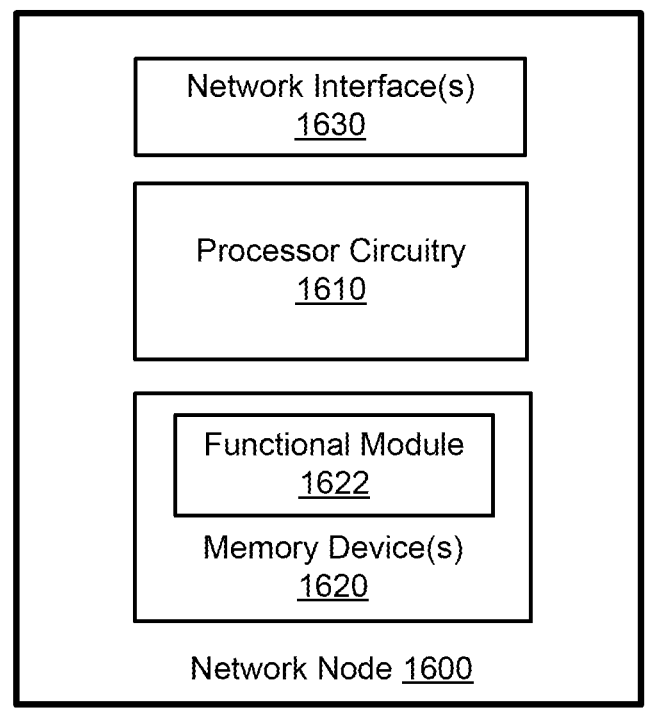
FIG. 16 is a block diagram of an example network node of FIGS. 1-4 that is configured according to some embodiments.

Example Network Node:

FIG. 16 is a block diagram of a network node 1600 that is configured according to some embodiments. The network node 1600 which may be used in one or more of the network nodes described above with regard to FIGS. 1-15, including, but not limited to, the pipe control node 102, the adaptive streaming server 230, edge router 210, the core network 140, the content delivery network server 150, the UE 130, and/or the mobile network 240. The network node 1600 can include one or more network interfaces 1630, processor circuitry 1610, and memory circuitry/devices 1620 that contain functional modules 1622. The network node 1600 may further include radio transceiver circuitry when included in a wireless communication type of UE 130 (e.g., mobile phone/data terminal).

The processor circuitry 1610 may include one or more data processing circuits, such as a general purpose and/or special purpose processor (e.g., microprocessor and/or digital signal processor). The processor circuitry 1610 is configured to execute computer program instructions from the functional modules 1622 in the memory circuitry/devices 1620, described below as a computer readable medium, to perform some or all of the operations and methods that are described above for one or more of the embodiments, such as the embodiments of FIGS. 1-15.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a pipe control node for managing network resources that are used to transport network traffic, the method comprising:
    allocating network resources to a virtual pipe for transporting a plurality of multimedia streams through the network;
    monitoring utilization of the network resources by the plurality of multimedia streams transported through the virtual pipe relative to the network resources allocated to the virtual pipe;
    managing the network resources that are used by the plurality of multimedia streams transported through the virtual pipe in response to the monitored utilization;
    determining whether a particular network traffic transports a video stream, wherein the determining further comprises
        comparing a source address of the video stream to a known list of source addresses providing video streams; and
    including the particular network traffic in the virtual pipe in response to the particular network traffic transports a video stream, and otherwise excluding the particular network traffic from utilization of the network resources allocated to the virtual pipe, in response to the particular network traffic not transporting a video stream.

2. The method of claim 1, wherein managing the network resources that are used by the plurality of multimedia streams transported through the virtual pipe in response to the monitored utilization comprises:
    constraining the network resources used by each of the multimedia streams transported through the virtual pipe in response to a combined utilization of the network resources by the multimedia streams exceeding a defined threshold level.

3. The method of claim 2, wherein constraining the network resources used by each of the multimedia streams transported through the virtual pipe comprises:
    controlling timing of delay between arrival of data packets of the multimedia streams at an input buffer of a network node and output forwarding of the data packets from the network node responsive to a defined scheduling algorithm.

4. The method of claim 3, wherein the defined scheduling algorithm comprises a Fair Network Queuing scheduling algorithm.

5. The method of claim 2, wherein constraining the network resources used by each of the multimedia streams transported through the virtual pipe comprises:
    controlling a data rate of the multimedia streams output by an adaptive streaming server.

6. The method of claim 2, wherein constraining the network resources used by each of the multimedia streams transported through the virtual pipe comprises:
    controlling a data rate of the multimedia streams output by a video content server.

7. The method of claim 1, wherein allocating network resources to the virtual pipe for transporting the plurality of multimedia streams through the network comprises:
    comparing requested data rates for the multimedia streams to a combined data bandwidth allocated to the virtual pipe for use by the plurality of multimedia streams; and
    controlling the combined data bandwidth allocated to the virtual pipe responsive to the comparison.

8. The method of claim 1, wherein allocating network resources to the virtual pipe for transporting the plurality of multimedia streams through the network comprises:
    comparing requested data rates for the multimedia streams to allowed data rates for the multimedia streams subject to the available resources of the network; and
    controlling the combined data bandwidth allocated to the virtual pipe responsive to the comparison.

9. A pipe control node that manages network resources which are used to transport network traffic, the pipe control node comprising circuitry configured to:
    allocate network resources to a virtual pipe for transporting a plurality of multimedia streams through the network;

monitor utilization of the network resources by the plurality of multimedia streams transported through the virtual pipe relative to the network resources allocated to the virtual pipe;

manage the network resources that are used by the plurality of multimedia streams transported through the virtual pipe in response to the monitored utilization;

determine whether a particular network traffic transports a video stream by comparing a source address of the video stream to a known list of source addresses providing video streams; and include the particular network traffic in the virtual pipe in response to the particular network traffic transporting a video stream, and otherwise excluding the particular network traffic from utilization of the network resources allocated to the virtual pipe in response to the particular network traffic not transporting a video stream.

10. The pipe control node of claim 9, wherein the circuitry, which manages the network resources that are used by the plurality of multimedia streams transported through the virtual pipe in response to the monitored utilization, is further configured to:

constrain the network resources used by each of the multimedia streams transported through the virtual pipe in response to a combined utilization of the network resources by the multimedia streams exceeding a defined threshold level.

11. The pipe control node of claim 10, wherein the circuitry, which constrains the network resources used by each of the multimedia streams transported through the virtual pipe, is further configured to:

control timing of delay between receipt of data packets of the multimedia streams at an input buffer of a network node and output forwarding of the data packets from the network node responsive to a defined scheduling algorithm.

12. The pipe control node of claim 11, wherein the defined scheduling algorithm comprises a Fair Network Queuing scheduling algorithm.

13. The pipe control node of claim 10, wherein the circuitry, which constrains the network resources used by each of the multimedia streams transported through the virtual pipe, is further configured to:

communicate with an adaptive streaming server to control a data rate of the multimedia streams output by the adaptive streaming server.

14. The pipe control node of claim 10, wherein the circuitry, which constrains the network resources used by each of the multimedia streams transported through the virtual pipe, is further configured to:

communicate with a video content server to control a data rate of the multimedia streams output by the video content server.

15. The pipe control node of claim 9, wherein the circuitry, which allocates network resources to the virtual pipe for transporting the plurality of multimedia streams through the network, is further configured to:

compare requested data rates for the multimedia streams to a combined data bandwidth allocated to the virtual pipe for use by the plurality of multimedia streams; and control the combined data bandwidth allocated to the virtual pipe responsive to the comparison.

16. The pipe control node of claim 9, wherein the circuitry, which allocates network resources to the virtual pipe for transporting the plurality of multimedia streams through the network, is further configured to:

compare requested data rates for the multimedia streams to allowed data rates for the multimedia streams subject to the management of the network resources; and control the combined data bandwidth allocated to the virtual pipe responsive to the comparison.

* * * * *